(12) United States Patent
Matsufuji et al.

(10) Patent No.: US 11,646,647 B2
(45) Date of Patent: May 9, 2023

(54) HEATING APPARATUS

(71) Applicant: KYUSHU NISSHO Co., Ltd., Fukuoka (JP)

(72) Inventors: Masaaki Matsufuji, Fukuoka (JP); Yisong Li, Fukuoka (JP); Sofiene Ben Souissi, Fukuoka (JP)

(73) Assignee: KYUSHU NISSHO CO., LTD., Fukuoka (JP)

( * ) Notice: Subject to any disclaimer, the term of this patent is extended or adjusted under 35 U.S.C. 154(b) by 0 days.

(21) Appl. No.: 17/518,086

(22) Filed: Nov. 3, 2021

(65) Prior Publication Data

US 2022/0337141 A1    Oct. 20, 2022

(30) Foreign Application Priority Data

Apr. 20, 2021    (WO) .................. PCT/JP2021/016018

(51) Int. Cl.
| | |
|---|---|
| *H02K 15/12* | (2006.01) |
| *B29C 45/14* | (2006.01) |
| *B29L 31/00* | (2006.01) |

(52) U.S. Cl.
CPC ....... *H02K 15/12* (2013.01); *B29C 45/14778* (2013.01); *B29C 2045/14286* (2013.01);
(Continued)

(58) Field of Classification Search
CPC ........ F21L 14/026; F27B 17/02; F24H 3/006; H02S 99/00; H02K 15/064; H02K 15/12; Y10T 29/53143
(Continued)

(56) References Cited

U.S. PATENT DOCUMENTS

| | | | |
|---|---|---|---|
| 10,249,519 B2* | 4/2019 | Abe ..................... | H05B 3/0047 |
| 2008/0276446 A1 | 11/2008 | Amano et al. | |

(Continued)

FOREIGN PATENT DOCUMENTS

| | | |
|---|---|---|
| JP | 62-293622 | 12/1987 |
| JP | 63-41787 | 2/1988 |

(Continued)

OTHER PUBLICATIONS

Office Action, Japan Patent Office, in Application No. 2021-561841, dated Jun. 2, 2022 (with English translation).

(Continued)

*Primary Examiner* — Thiem D Phan
(74) *Attorney, Agent, or Firm* — Greenblum & Bernstein P.L.C.

(57) ABSTRACT

A heating apparatus for heating an object having a cylindrical outer peripheral surface includes: a support member for supporting the object to be heated; a covering member movable in the vertical directions relative to the support member and having inner wall surfaces with an open lower end, the inner wall surfaces defining an accommodation space for accommodating the object to be heated; the covering member closing the accommodation space when the covering member is disposed on the support member; the covering member allowing loading or unloading of the object to be heated when the covering member is separated from the support member; and a plurality of ring-shaped light sources each provided to surround the cylindrical outer peripheral surface of the object to be heated and arranged in the vertical direction in the accommodation space and radiating light for heating the object to be heated.

10 Claims, 8 Drawing Sheets

(52) U.S. Cl.
CPC . *B29K 2995/0008* (2013.01); *B29L 2031/749* (2013.01); *Y10T 29/53143* (2015.01)

(58) Field of Classification Search
USPC .......... 29/732, 596, 598, 721, 729, 738.33 K
See application file for complete search history.

(56) References Cited

U.S. PATENT DOCUMENTS

| | | |
|---|---|---|
| 2014/0126894 A1 | 5/2014 | Ohsugi et al. |
| 2015/0093100 A1 | 4/2015 | Ranish |
| 2020/0161946 A1 | 5/2020 | Kimura et al. |

FOREIGN PATENT DOCUMENTS

| | | | | |
|---|---|---|---|---|
| JP | 63-16155 | | | 5/1988 |
| JP | 63-188940 | | | 8/1988 |
| JP | H08264473 | A | * | 3/1995 |
| JP | 8-45863 | | | 2/1996 |
| JP | 8-264473 | | | 10/1996 |
| JP | H1183337 | A | * | 9/1997 |
| JP | 11-83337 | | | 3/1999 |
| JP | 2004-137124 | | | 5/2004 |
| JP | 2007197282 | A | * | 1/2006 |
| JP | 2007-227461 | | | 9/2007 |
| JP | 2008-198548 | | | 8/2008 |
| JP | 2008-199890 | | | 8/2008 |
| JP | 2010-26022 | | | 2/2010 |
| JP | 2011-220649 | | | 11/2011 |
| JP | 2013110289 | A | * | 11/2011 |
| JP | 2013-110289 | | | 6/2013 |
| JP | 2017-68921 | | | 4/2017 |
| JP | 2018-7565 | | | 1/2018 |
| JP | 2018-858894 | | | 5/2018 |
| JP | 2020-88909 | | | 6/2020 |
| JP | 2021-9003 | | | 1/2021 |
| WO | 2013/111726 | | | 8/2013 |

OTHER PUBLICATIONS

Office Action, Japan Patent Office, in Japan Patent Application No. 2021-561841, dated Feb. 14, 2022 (with English translation).

Japanese Office Action, Japan Patent Office, Japanese Application No. 2021-561841, dated Mar. 4, 2022 (with English translation).

* cited by examiner

HEATING APPARATUS

CROSS-REFERENCE TO RELATED APPLICATIONS

This application is based upon and claims the benefit of priority from the PCT Patent Application No. PCT/JP2021/016018, filed Apr. 20, 2021 the entire content of which is incorporated herein by reference.

The present invention relates to a heating apparatus capable of efficiently and uniformly heating an object having a cylindrical outer peripheral surface portion of a motor core or the like.

BACKGROUND ART

A motor core, which is a component forming an iron core portion of a rotor constituting an electric motor, is generally manufactured by laminating a certain number of mold-pressed electromagnetic steel sheets or etched electromagnetic steel sheets.

The motor core (rotor core) is produced by laminating a certain number of electromagnetic steel sheets, inserting magnets to a plurality of magnet insertion holes provided in the laminate, filling the magnet insertion holes with a resin, and curing the filled resin to fix the magnets (e.g., see Patent Literature 1, 2, etc.).

PATENT LITERATURE

PTL 1: Japanese Laid-Open Patent Application No. 2008-199890

PTL 2: Japanese Laid-Open Patent Application No. 2018-007565

SUMMARY OF INVENTION

Technical Problem

In the resin sealing method described above, the segmented magnets are inserted in the motor core, they are preheated and thereafter, molten resin is injected. The preheating step before injecting the molten resin is an essential step in order to prevent drop of the temperature of the resin material and consequent drop of fluidity at the time of filling the liquid resin material into the magnet insertion hole, to thereby prevent insufficient filling of the resin and insufficient curing of the filled resin.

In this preheating step, in order to improve the production efficiency while maintaining good filling of the resin material, it is necessary to heat the motor core that is a laminate of a predetermined number of electromagnetic steel sheet as quickly as possible and as uniformly as possible at the target temperature. It is necessary to quickly heat the motor core, so that the temperature in the vicinities of the magnet insertion holes arranged in the outer peripheral portion and filled with the resin material reaches the target temperature with a temperature uniformity in the vertical direction and the circumferential direction of the motor core.

Furthermore, in order to increase the efficiency and automate the processing of a large amount of motor cores, there is a request to incorporate the preheating process in-line in the manufacturing process so as not to interfere with the production flow.

An object of the present invention is to provide a heating apparatus capable of efficiently and uniformly heating an object having a cylindrical outer peripheral surface, and particularly, to provide a heating apparatus capable of uniformly and efficiently heating a motor core and its holding jig in a preheating step before resin filling of the motor core.

Another object of the present invention is to provide a heating apparatus which can incorporate a preheating process in-line in a process of manufacturing a motor core and which enables automation of the preheating process.

Solution to Problem

The heating apparatus according to a first aspect of the present invention is a heating apparatus for heating an object having a cylindrical outer peripheral surface, comprising:
 a support member for supporting the object to be heated; a covering member provided so as to be relatively movable in a vertical direction with respect to the support member, and having an inner wall surface with an open lower end, the inner wall surface defining an accommodation space for accommodating the object to be heated, the covering member closing the accommodation space when the covering member is disposed on the supporting member, and the covering member allowing loading or unloading of the object to be heated when the covering member is separated from the supporting member; and a plurality of ring-shaped light sources each provided to surround the cylindrical outer peripheral surface of the object to be heated and arranged in a vertical direction in the accommodating space and radiating light for heating the object to be heated.

Preferably, the inner wall surface of the covering member is provided with a reflecting surface for reflecting the light from the plurality of ring-shaped light sources toward the object to be heated. More preferably, a configuration may be employed in which the reflecting surface is formed of a mirror surface obtained by mirror finishing the inner wall surface of the covering member.

A configuration may be employed in which each of the plurality of ring-shaped light sources has a filament emitting light and a glass tube covering the filament, wherein the glass tube has a reflective surface that reflects the light emitted from the filament toward the object to be heated.

Preferably, a configuration may be employed in which the inner wall surface provided with the reflecting surface is a cylindrical inner wall surface, and wherein the cylindrical inner wall surface, the plurality of ring-shaped light sources, and the cylindrical outer peripheral surface of the object to be heated are concentrically arranged.

More preferably, a configuration may be employed in which the heating apparatus comprises a light shielding member provided on the inner wall surface of the covering member, for blocking incidence of mutual light between two adjacent ring-shaped light sources of the plurality of ring-shaped light sources.

In this case, a configuration may be employed in which the heating apparatus further comprises a power supply device for independently controlling outputs of the two adjacent ring-shaped light sources separated by the light shielding member.

Preferably, a configuration may be employed in which the light shielding member has a structure for preventing deformation due to thermal expansion.

In addition, a configuration may be employed in which the object to be heated includes a motor core formed of a stack of a predetermined number of annular thin steel plates. The motor core is held by a holding jig having a support post penetrating the center portion of the motor core and a support plate provided with the support post. The plurality of ring-shaped light sources heats the cylindrical outer peripheral surface of the motor core. The heating apparatus further comprises a heating mechanism for heating the holding jig.

A heating apparatus according to a second aspect of the present invention comprises a plurality of light sources arranged in a predetermined direction for emitting light for heating an object to be heated,
 a light shielding member for blocking incidence of mutual light between the plurality of light sources, and
 a power supply device for independently controlling outputs of the light sources separated by the light shielding member.

Advantageous Effects of Invention

According to the present invention, an object to be heated having a cylindrical outer peripheral surface portion, more specifically, a portion in the vicinity of a magnet insertion hole near the outer peripheral portion of the motor core and filled with a resin material, can be heated quickly with a temperature uniformity in the vertical direction and the circumferential direction of the motor core.

DESCRIPTION OF EMBODIMENTS

Figure 1:
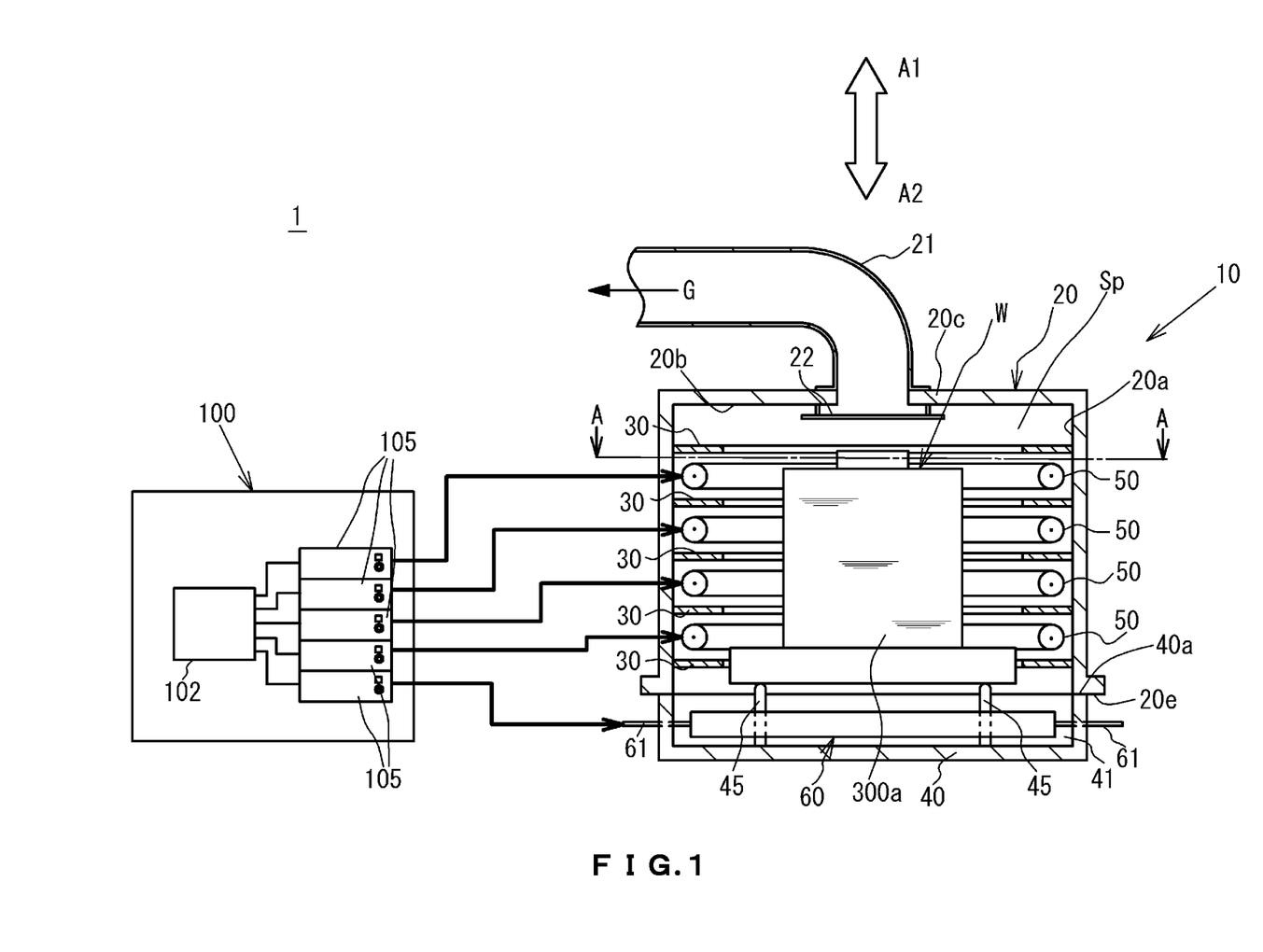
FIG. 1 is a schematic configuration diagram including a longitudinal cross-sectional view of a part of a heating apparatus according to an embodiment of the present invention.
Figure 2:
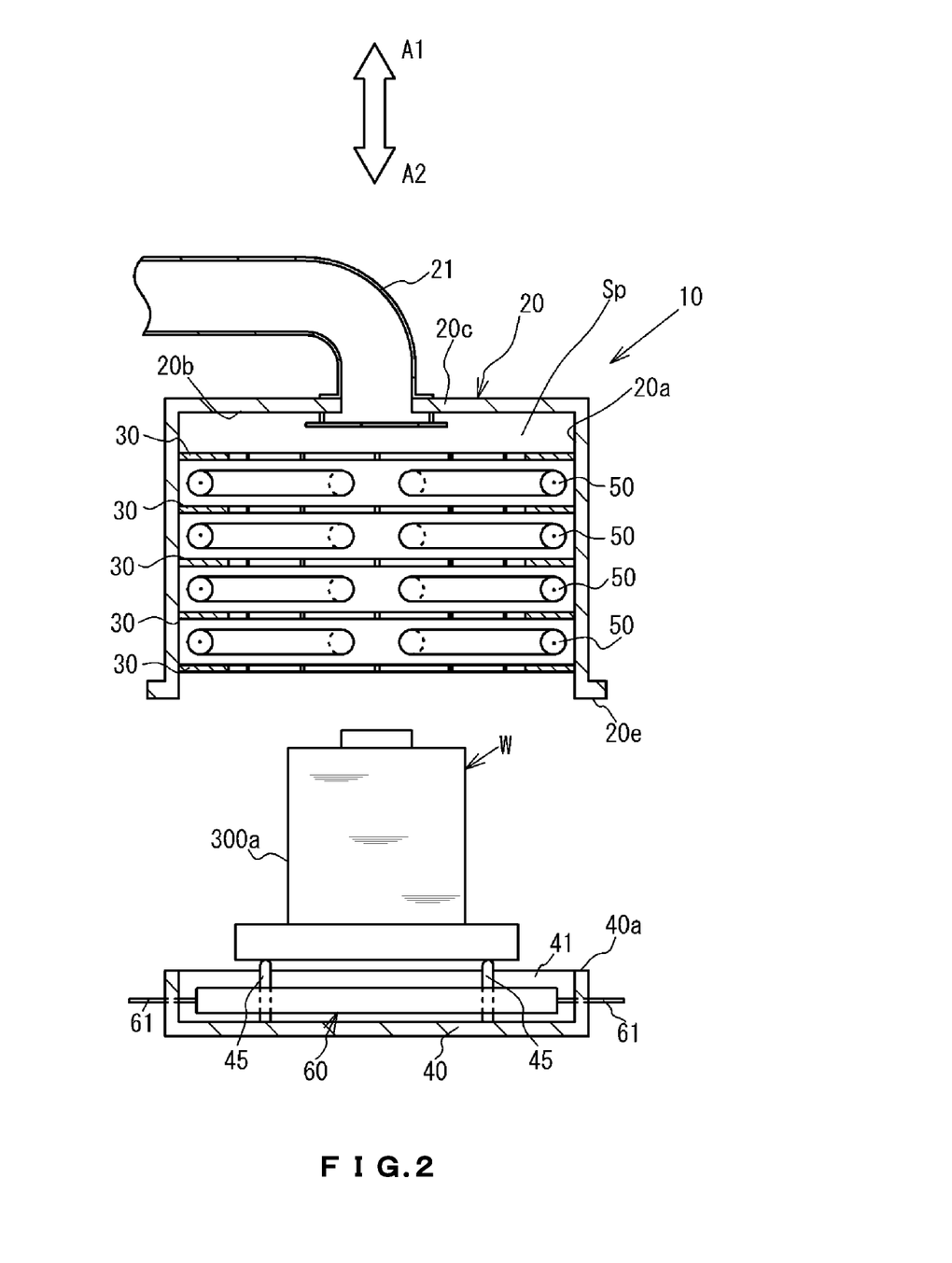
FIG. 2 is a longitudinal sectional view of a heating furnace showing a state in which a covering member of the heating furnace in FIG. 1 is raised.
Figure 3:
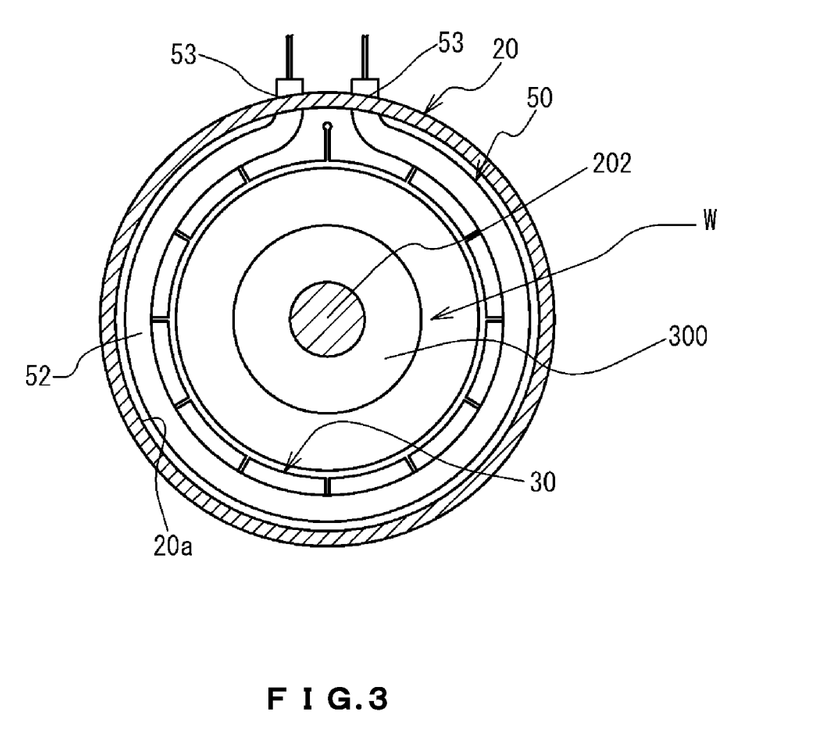
FIG. 3 is a cross-sectional view taken along line A-A of the heating furnace in FIG. 1.

Hereinafter, a heating apparatus 1 according to an embodiment of the present invention will be described with reference to the drawings. FIG. 1 shows the configuration of the heating apparatus according to an embodiment of the present invention, FIG. 2 shows the structure of the heating furnace 10 in the open state of the heating apparatus, and FIG. 3 shows a sectional view taken along line A-A of the heating furnace 10 in FIG. 1.

Heating apparatus 1 includes a heating furnace 10 and a power supply device 100.

Heating furnace 10 includes a support member 40 for supporting the object to be heated W, a covering member 20 covering the object to be heated W supported by the support member 40, a plurality of ring-shaped light sources 50 radiating light for heating the object W, and light shielding members 30 for shielding the light emitted from the plurality of ring-shaped light sources 50.

Covering member 20 is formed in a cylindrical shape with a ceiling portion 20c, in which the lower end portion is opened, and defines an accommodation space Sp for accommodating the object to be heated W by a cylindrical inner wall surface 20a and a ceiling surface 20b that is a lower surface of the ceiling portion 20c. The covering member 20 is formed of a heat-resistant metal material, and the cylindrical inner wall surface 20a is mirror-finished that reflects light emitted from the ring-shaped light sources 50. In the present embodiment, although the cylindrical inner wall surface 20a is a mirror-finished reflective surface, the construction is not limited thereto, and it is also possible to form a reflective film on the cylindrical inner wall surface 20a by vapor deposition or the like. Incidentally, the ceiling surface 20b may also be a reflective surface formed by mirror finish or the like, or it may be a non-reflective surface.

The covering member 20, as can be seen from FIGS. 1 and 2, is movable in the upward direction A1 and the downward direction A2 with respect to the support member 40 by a lifting mechanism (not shown). It is also possible to move the support member 40 in the upward direction A1 and the downward direction A2 with respect to the covering member 20.

In the covering member 20, an exhaust pipe 21 is provided in the ceiling portion 20c, so that a gas generated in the accommodation space Sp of the covering member 20 can be discharged to the outside. In the inlet of the exhaust pipe 21, a flow-conditioning device 22 is provided. The flow-conditioning device 22 is provided to suppress the occurrence of turbulence in the air or gas in the accommodation space Sp when discharging the gas generated in the accommodation space Sp to the outside, thereby to suppress the occurrence of temperature unevenness in the object to be heated W. Flow-conditioning device 22 may, although not limited thereto, have a structure provided with a cylindrical outer peripheral surface, having gas intake ports that take in gas evenly from the entire circumference of the outer peripheral surface. By taking the gas evenly from the entire periphery of the flow-conditioning device 22 and flowing the gas in the exhaust pipe 21, it is possible to suppress as much as possible the deviation of the gas flow in the accommodation space Sp, thereby to suppress the temperature unevenness generated in the object to be heated W. Further, when an outer gas is occurred by heating of the object W, it is also possible to connect a pump to the exhaust pipe 21 and forcibly discharge the gas in the accommodation space Sp to the outside at a constant flow rate. When the pump is not used, the gas is naturally exhausted by utilizing the upward flow of the gas that has risen in temperature due to light heating.

A plurality of ring-shaped light sources 50, as shown in FIG. 3, are arranged at predetermined intervals in the vertical direction inside the cylindrical inner wall surface 20a.

Figure 4A:
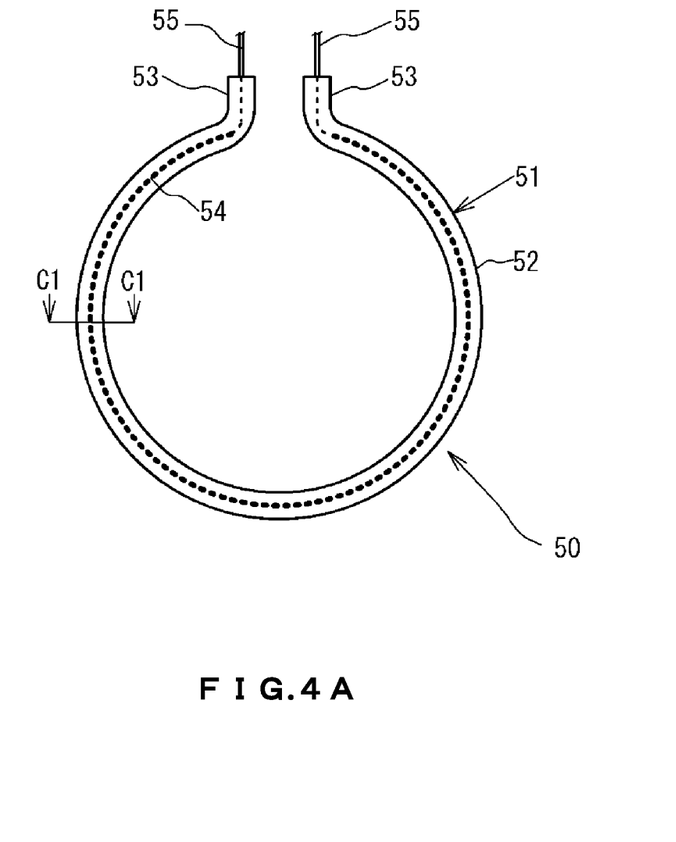
FIG. 4A is a plane view showing the structure of a ring-shaped light source.

As shown in the drawing 4A, each of the plurality of ring-shaped light sources 50 has a transparent glass tube 51 composed of a ring-shaped portion 52 and straight portions 53 connected to both end portions of the ring-shaped portion 52, and a ring-shaped filament 54 for emitting light provided in the ring-shaped portion 52 of the glass tube 51.

The filament 54 is not provided in the straight portions 53 of the glass tube 51 so as not to generate heat there, and feeding wires 55 are inserted therethrough and connected to the end portions of the filament 54. The power supply wirings 55 are electrically connected to the power supply device 100 shown in FIG. 1, as will be described later.

As will be described later, the straight portions 53 penetrate the cylindrical wall portion of the covering member 20, and are fixed to and supported by the wall portion.

In the present embodiment, each of the plurality of ring-shaped light sources 50 is a halogen lamp in which a halogen gas is sealed in a glass tube 51. The halogen lamp utilizes light emitted from the filament 54, such as tungsten or nichrome wire, that is energized to a high temperature (the wavelength of this light is the electromagnetic wave in the near infrared to visible range). It is also possible to use a light source such as a far-infrared lamp, a xenon lamp or a laser. Halogen lamps have such advantages that they have relatively high conversion efficiencies to radiant energy, their outputs can be easily controlled, their power supply device 100 can be miniaturized, and they can reduce costs.

When, for example, a nichrome wire is used as the light source, it is also possible to adopt a configuration in which the nichrome wire is not covered by the glass tube 51.

Figure 4B:
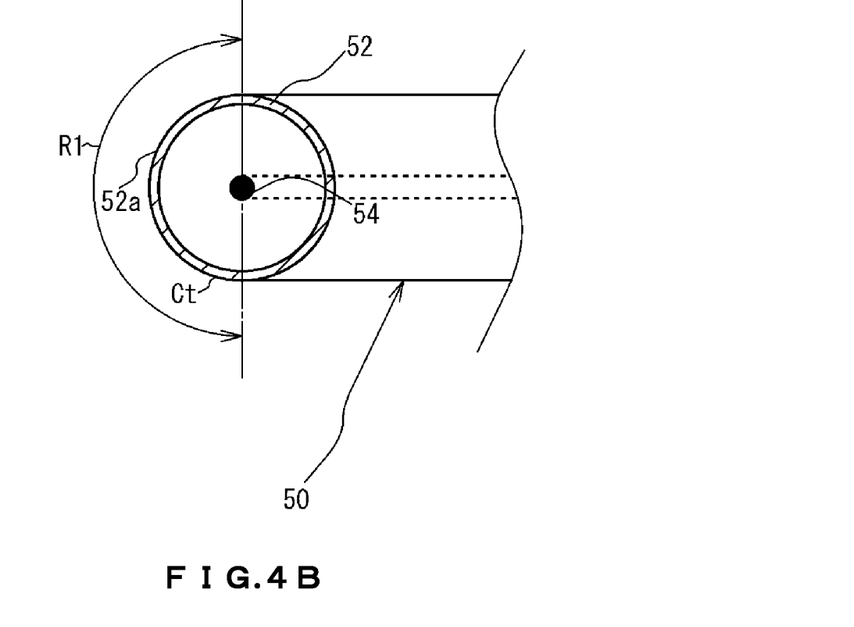
FIG. 4B is a cross-sectional view taken along line C1-C1 of a ring-shaped light source in FIG. 4A.

FIG. 4B shows a cross-sectional view of C1-C1 line in FIG. 4A.

In the ring-shaped portion 52 of the glass tube 51, as shown in FIG. 4B, a reflection film Ct is formed in a region R1 on the outer side of the peripheral surface 52*a* of the ring-shaped portion 52. The range of the region R1 in which the reflection film Ct is formed is a range of 180 degrees outside the peripheral surface 52*a* about the strand 54 as the center. However, the range of the region R1 is not limited thereto, it may be in a range larger than 180 degrees or in a range smaller than 180 degrees, and it may be adjusted as appropriate.

As will be described later, the reflection film Ct functions to reflect the light emitted from the strand 54 toward the side of the object to be heated W. The material forming the reflection film Ct is ceramic, but is not limited thereto, and any material may be used as long as it is heat-resistant and has a property of reflecting light.

A plurality of light shielding members 30, as shown in FIGS. 1 and 2, are constituted by those disposed between the two ring-shaped light sources 50 and 50 adjacent in the vertical direction among the plurality of ring-shaped light sources 50 arranged at a distance in the vertical direction, and; one disposed above the uppermost of the ring-shaped light source 50 among the plurality of ring-shaped light sources 50; and one disposed below the lowermost ring-shaped light source 50 among the plurality of ring-shaped light sources 50.

As can be seen from FIGS. 1 to 3, the light shielding member 30 is fixed to the cylindrical inner wall surface 20*a* of the covering member 20. There are various fixing methods such as welding or bolt fastening, and an optimal fixing method can be adopted as appropriate, but detailed description thereof is omitted.

Figure 5A:
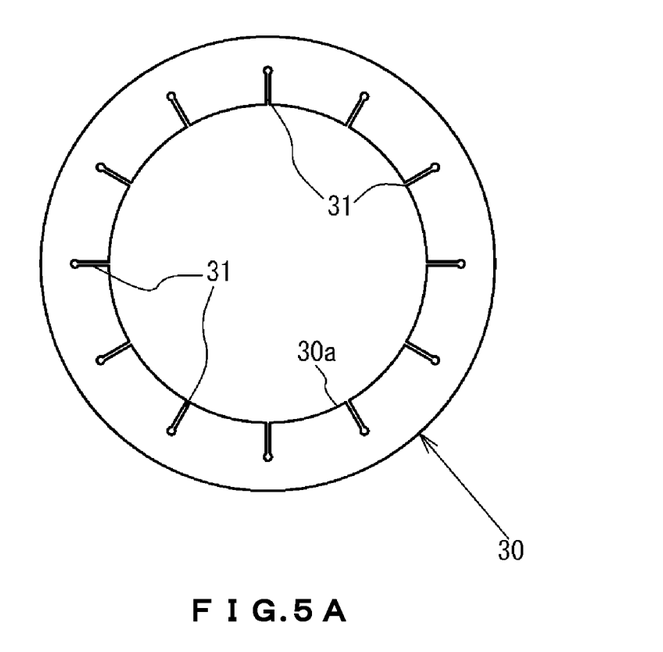
FIG. 5A is a plan view of a light shielding member.

FIG. 5A shows the construction of the light shielding member 30.

Light shielding member 30, as shown in FIG. 5A, is made of an annular disc, in which a plurality of slits 31 extending radially toward the outer peripheral side from the inner circumference is formed at predetermined angular intervals. The light shielding member 30 is formed of a heat-resistant member such as ceramic or metal, and functions to shield the light from the ring-shaped light source 50. A plurality of slits 31 serves to prevent the deformation of the light shielding member 30 due to thermal expansion when the temperature of the light shielding member 30 is raised by light from the ring-shaped light source 50.

A plurality (three) of light shielding members 30 each arranged between two ring-shaped light sources 50 and 50 adjacent in the vertical direction serve to prevent light from entering from one to the other between the two adjacent ring-shaped light sources 50 and 50. That is, to block the incidence of mutual light between the two adjacent ring-shaped light sources 50 and 50. The reason why the plural (three) light shielding members 30 are provided will be described later.

The light shielding member 30 disposed above the uppermost ring-shaped light source 50 of the plurality of ring-shaped light sources 50, is provided mainly to prevent overheating of the ceiling portion of the covering member 20 by blocking the light emitted from the uppermost ring-shaped light source 50.

The light shielding member 30 disposed below the lowermost ring-shaped light source 50 of the plurality of ring-shaped light sources 50, is provided mainly to prevent overheating of the support member 40 by blocking the light emitted from the lowermost ring-shaped light source 50.

The structure of the light shielding member 30 is not limited to the structure shown in FIG. 5A, and various modes can be adopted as long as it has a light shielding function.

Figure 5B:
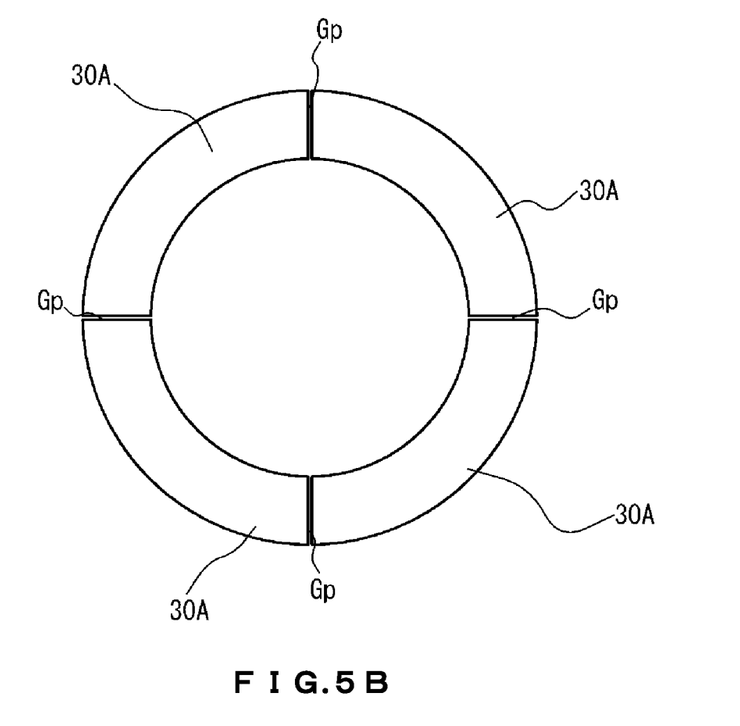
FIG. 5B is a plan view showing a modification of the light shielding member.

For example, as shown in FIG. 5B, by combining a plurality of separated fan-shaped light shielding members 30A and fixing them to the cylindrical inner wall surface 20*a* of the covering member 20 so as to form a gap Gp between adjacent light shielding members 30A, it is possible to prevent deformation of the light shielding member 30A while realizing the light shielding function.

Support member 40 is formed of a heat-resistant metal material, and it has a recess 41 and an upper end surface 40*a* in contact with the lower end surface 20*e* of the covering member 20.

In the recess 41 of the support member 40, a plurality of support pins 45 for supporting the object to be heated W, and a light source 60 as a heating mechanism for heating the object to be heated W from the bottom are provided.

The plurality of support pins 45, as will be described later, each has a tip end portion protruding upward from the upper end surface 40*a* of the support member 40 in order to facilitate the automatic loading and unloading of the object to be heated.

The plurality of light sources 60 are each formed in a straight line, but it has basically the same structure as the ring-shaped light source 50. Both end portions 61 which are non-heating portions are supported by the wall portion of the support member. Although the plurality of light sources 60 are linear, the shape is not limited thereto, and it is also possible to adopt other shapes. A power supply device 100 supplies power to the plurality of light sources 60 through power supply wiring (not shown).

As will be described later, when the covering member 20 descends with respect to the support member 40 and the lower end surface 20*e* of the covering member 20 comes into contact with the upper end surface 40*a* of the support member 40, the support member 40 closes the opening of the lower end of the covering member 20 and isolates the accommodation space Sp from the outside.

The power supply device 100 includes a controller 102 and multiple drivers 105 that control the power supplied to the plurality of ring-shaped light sources 50 and the plurality of light sources 60, as shown in FIG. 1. Although only one driver 105 corresponding to the plurality of light sources 60 is shown, it is possible to provide respective drivers 105 corresponding the plurality of light sources 60. Alternatively, the outputs of the plurality of light sources 60 can be commonly controlled by a common driver 105.

The controller 102 includes hardware such as a processor and a memory, and required software, and is formed so as to be capable of outputting independent control commands to the plurality of drivers 105.

Each of the plurality of drivers 105 controls the power supplied to the plurality of ring-shaped light sources 50 and the plurality of light sources 60 in response to a control command from the controller 102.

Each of the plurality of drivers 105, for example, incorporates a thyristor and performs on-off control in response to a command voltage given from the controller 102 the thyristor, thereby to convert the AC voltage supplied from the commercial power source to an AC voltage of a desired magnitude. Therefore, the power supply device 100 has a relatively simple configuration, and it can be miniaturized.

FIGS. 6A to 8B show an example of an object to be heated W.

Figure 6A:
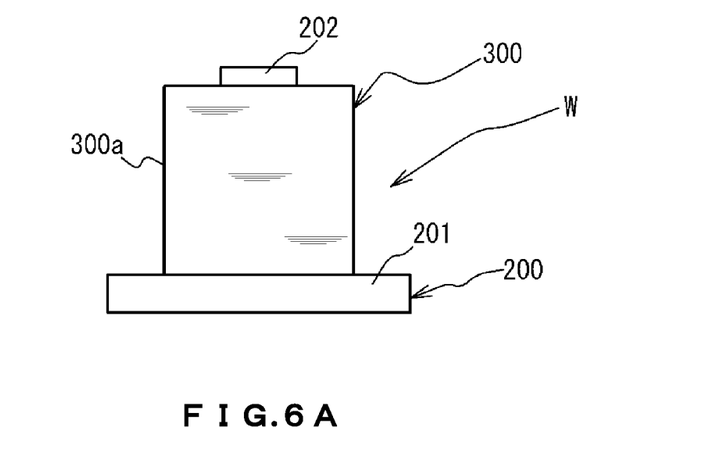
FIG. 6A is a front view of an object to be heated.
Figure 6B:
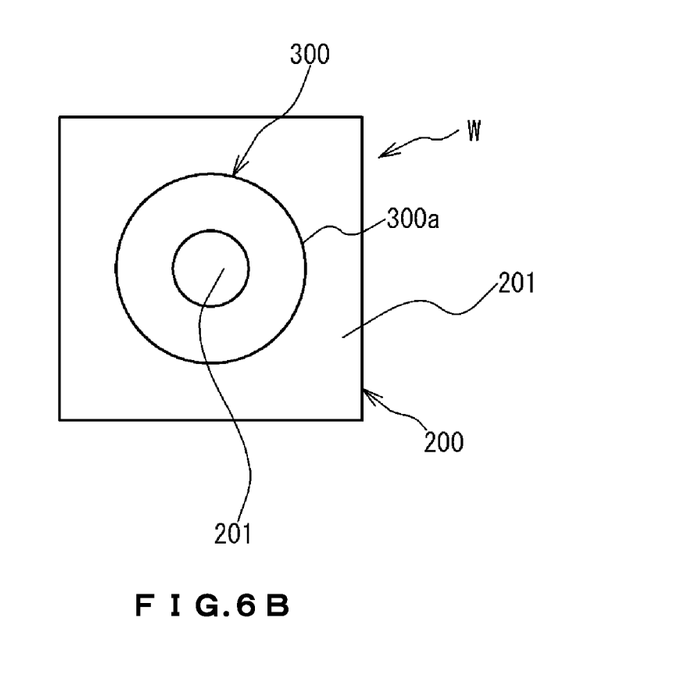
FIG. 6B is a top view of the object to be heated in FIG. 6A.

The object to be heated W includes a motor core 300 that is a stack of a predetermined number of annular thin steel plates 301, and a holding jig 200 that holds the motor core 300.

Figure 7A:
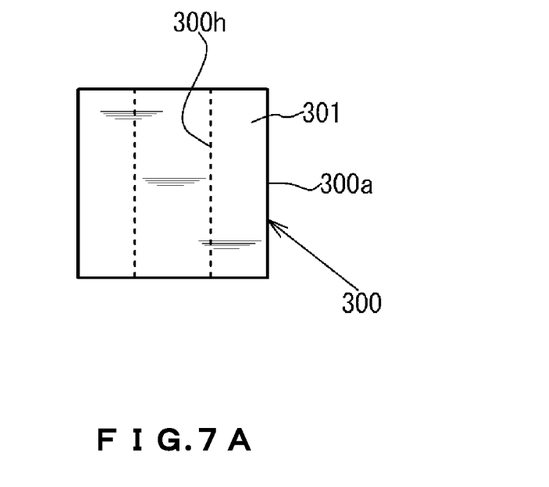
FIG. 7A is a front view of a motor core.
Figure 7B:
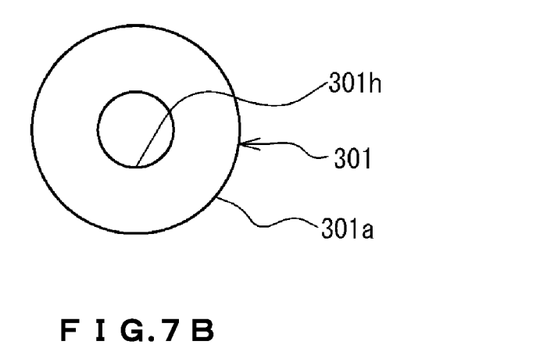
FIG. 7B is a plan view of a single thin steel sheet constituting the motor core in FIG. 7A.

When a predetermined number of annular thin steel plates 301 are stacked, the cylindrical outer peripheral surface 300a of the motor core 300 is defined by the outer peripheral surfaces 301a of the predetermined number of thin steel plates 301. The inner peripheral surfaces 301h of the stacked predetermined number of the annular thin steel plates 301 define a through hole 300h at the center of the motor core 300.

Figure 8A:
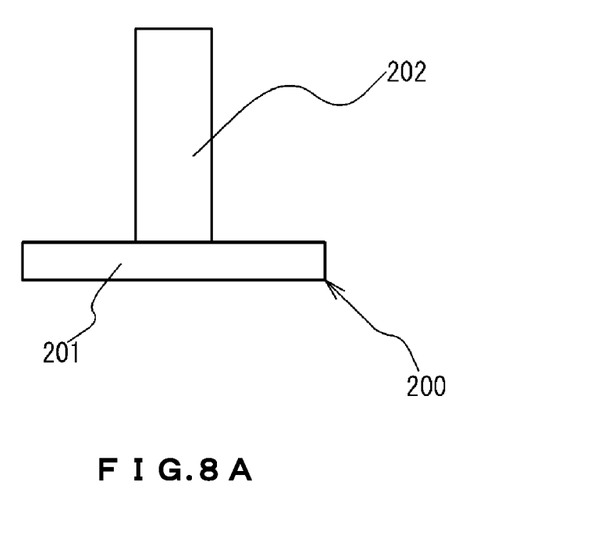
FIG. 8A is a front view of a holding jig for holding the motor core.
Figure 8B:
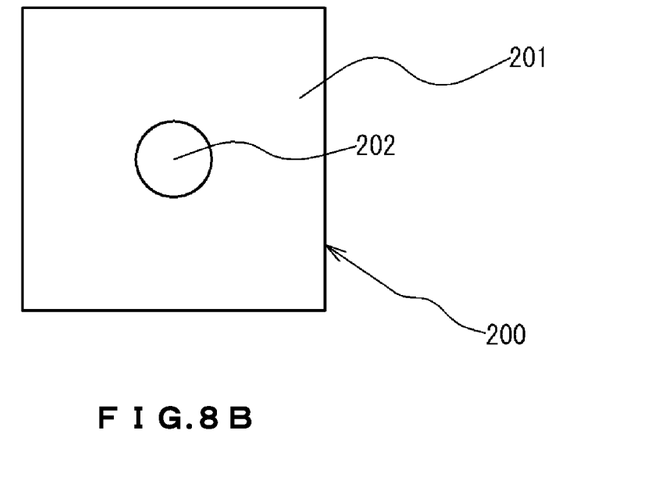
FIG. 8B is a top view of the holding jig shown in FIG. 8A.

Holding jig 200 has a metal support plate 201 with a rectangular outer shape, a cylindrical support column 202 provided perpendicular to the support plate 201 at the center of the support plate 201. The support column 202 is inserted and fitted into a through hole 300h of the motor core 300.

In the motor core 300, a plurality of magnet insertion holes (not shown) is provided in the vicinity of the outer periphery, and after a magnet is inserted into each of these holes, a resin is filled in the magnet insertion holes, and the filled resin is cured, whereby the magnet is fixed. As described above, a preheating step of heating the motor core 300 to a predetermined temperature is indispensable before the resin filling step. The heating apparatus 1 is used in this preheating step.

As shown in FIG. 3, the cylindrical outer peripheral surface 300a of the motor core 300 of the object to be heated W and the support column 202 of the holding jig 200 are concentrically arranged with the cylindrical inner wall surface 20a of the covering member 20, the plurality of ring-shaped light sources 50, and the light shielding members 30.

As shown in FIGS. 1 and 2, the plurality of ring-shaped light sources 50 are arranged in a way that enables heating from the upper end to the lower end of the cylindrical outer peripheral surface 300a of the motor core 300 of the object to be heated W.

Next, an example of the procedure of the preheating process of the object to be heated W by the heating apparatus 1 will be described.

As shown in FIG. 2, the covering member 20 of the heating furnace 10 is raised in the upward direction A1 with respect to the support member 40. At this time, power is already supplied from the power supply device 100 to the plurality of ring-shaped light sources 50 and the plurality of light sources 60, and it is assumed that the light for heating is being emitted from the plurality of ring-shaped light sources 50 and the plurality of light sources 60.

Next, the object to be heated W is placed on the support pins 45 of the support member 40 by using a conveying device such as a handling robot (not shown).

Next, as shown in FIG. 1, the covering member 20 in the raised state is lowered, and the lower end surface 20e of the covering member 20 is brought into contact with the upper end surface 40a of the support member 40. As a result, the space defined by the accommodation space of the covering member 20 and the concave portion of the support member 40 is closed, and heating of the object to be heated W is started.

Gases in the accommodation space Sp including the gas generated by heating of the object to be heated W is gradually discharged to the outside through the exhaust pipe 21.

During the heating of W, a required gas such as an inert gas can be supplied into the accommodation space Sp.

Since the plurality of ring-shaped light sources 50 surround the cylindrical outer peripheral surface 300a of the motor core 300, a part of the light emitted from the ring-shaped light sources 50 is radiated to the entire circumference of the cylindrical outer peripheral surface 300a.

Of the light emitted from each ring-shaped light source 50, a part of the light directed outward in the radial direction of the ring-shaped light source 50 is reflected by the reflection film Ct formed on the ring-shaped portion 52 of the glass tube 51 and redirected toward the cylindrical outer peripheral surface 300a of the motor core 300.

Of the light emitted from the ring-shaped light source 50, a part of the light directed outward in the radial direction of the ring-shaped light source 50 and reaching the cylindrical inner wall surface 20a of the covering member 20, is reflected toward the cylindrical outer peripheral surface 300a of the motor core 300 because the cylindrical inner wall surface 20a has a cylindrical shape.

Light emitted from the light source 60 is mainly radiated to the support plate 201 of the holding jig 200 to heat the holding jig 200.

Thus, in the heating furnace 10, since the light from the plurality of ring-shaped light sources 50 and the light sources 60 is efficiently used for heating the object to be heated W, it is possible to quickly raise the temperature of the object to be heated W.

Here, an example of temperature control for making the temperature of the object to be heated W uniform will be described.

Since heat generated in the heating furnace 10 rises upward, the temperature of the atmosphere tends to be higher toward the upper side of the motor core 300.

Therefore, it is necessary to adjust the output of the plurality of ring-shaped light source 50 independently. Generally, the output is reduced as the position of the ring-shaped light source 50 is higher, and the output is increased as the position of the ring-shaped light source 50 is lower.

For example, it is possible to provide a temperature sensor capable of detecting the temperature of the motor core 300 in a non-contact manner in the heating furnace 10 and feedback the detected temperature to the controller 102 of the power supply device 100 to independently control the outputs of the plurality of ring-shaped light source 50 so that the temperature of the motor core 300 becomes uniform.

Further, it is also possible to obtain respective outputs of the plurality of ring-shaped light source 50 for making the temperature of the motor core 300 uniform in advance by experiments or the like, and adjust the powers supplied to the ring-shaped light sources 50 in accordance with this information.

Here, it is important that, in order to accurately control the output of each ring-shaped light source 50, it is necessary to avoid mutual incidence of light between adjacent ring-shaped light sources 50, in the vertical direction. When light from another ring-shaped light source 50 is incident to one ring-shaped light source 50, even if power supplied to said one ring-shaped light source 50 is accurately controlled, it is difficult to control the output to the target. To avoid this, the light shielding members 30 are arranged between the three ring-shaped light sources 50 other than the ring-shaped light source 50 arranged in the uppermost and lowermost stages.

In the manner described above, the motor core 300 is heated for a predetermined time. Specifically, the vicinities of the magnet insertion holes (not shown) filled with resin material of the motor core 300 are heated so that the temperature reaches to a target temperature with a temperature uniformity in the vertical and circumferential directions of the motor core 300.

When the required heating of the object to be heated W (motor core 300) is completed, as shown in FIG. 2, the covering member 20 is raised to be separated from the support member 40, so that the object to be heated W can be unloaded. Then, using a conveying device such as a handling robot (not shown), the object to be heated W placed on the support pins 45 of the support member 40 is unloaded and sent to the resin filling step, and a new object to be heated W is loaded on the support pins 45 of the support member 40. By repeating these procedures, the heating of multiple motor cores 300 can be performed in the flow operation.

The advantages of light heating using a plurality of ring-shaped light sources 50 will be described.

First, when a plurality of ring-shaped light sources 50 are used, the cylindrical outer peripheral surface 300a of the motor core 300 can be heated in a non-contact manner, and it is possible to prevent problems such as adhesion of particles to the motor core 300, and to maintain a high degree of cleanliness.

Second, since the motor core 300, as described above, is obtained by laminating a plurality of thin steel plates 301, when the outer peripheral surface of the motor core 300 is rapidly heated, the outer peripheral portion of the plurality of thin steel plates 301 may undergo a thermal deformation, and a gap may be formed between the plurality of thin steel plates 301 to make the motor core defective. The plurality of ring-shaped light sources 50 can be independently controlled as described above, and by using a thyristor to control the supplied voltages, it is possible to finely adjust the outputs of the plurality of ring-shaped light source 50 relatively easily. Therefore, in the initial stage of heating, the output of each ring-shaped light source 50 is controlled so that the thermal deformation does not occur on the outer peripheral portion of the plurality of thin steel plates 301, and as the heat penetrates toward the inside of the motor core 300, the output of each the ring-shaped light sources 50 is increased, whereby it is possible to prevent the problem of thermal deformation, and to heat the motor core 300 to a target temperature while maintaining a temperature uniformity in the circumferential direction and the vertical direction of the motor core 300. That is, by using the ring-shaped light sources 50, it is possible to control the output with high precision, and in order to ensure the feature that the output can be controlled with this high precision, the light shielding members 30 are provided. The target temperature for heating the peripheries of the plurality of magnet insertion holes (not shown) of the motor core 300 is a temperature near the melting temperature of the resin used in the resin filling process.

As a heating method other than the light heating, for example, induction heating can be mentioned. The disadvantage of induction heating for heating the motor core 300 is that, first, the size of the apparatus becomes larger, and the cost becomes higher. In the induction heating, it is necessary to provide a heating coil around the motor core 300, it is necessary to generate a very high frequency current from a commercial power source by using a switching element, and supply the current to the heating coil, and as a result, the apparatus becomes complicated, enlarged, and high cost.

Second, in the control of the heating by induction heating, it is necessary to adjust the frequency of the current supplied to the heating coil and the magnitude of the current supplied to the heating coil, it is very difficult to heat the temperature of the portions in the peripheries of a plurality of magnet insertion holes in the vicinity of the outer peripheral portion of the motor core 300 to a target temperature with a temperature uniformity in the circumferential direction and the vertical direction while solving the problem of thermal deformation of the outer peripheral portion described above by performing these adjustments. In particular, heating by induction tends to overheat the thin steel plate 301 above the target temperature, which may cause thermal oxidation of the thin steel plate 301.

Compared with this, in the light heating, by finely adjusting the voltage supplied to each of the ring-shaped light source 50, it is possible to heat the temperature of the portions in the vicinities of a plurality of magnet insertion holes in the vicinity of the outer peripheral portion of the motor core 300 to a target temperature with a temperature uniformity in the circumferential direction and the vertical direction while securely preventing thermal deformation of the outer peripheral portion of the motor core 300. Further, in the light heating, since the output control is relatively easy, it is possible to easily avoid thermal oxidation of the thin steel plate 301 due to overheating of the thin steel plate 301 above the target temperature.

Heating of the motor core 300, as described above, needs to be performed so that the temperature of the peripheries of the plurality of magnet insertion holes (not shown) provided in the vicinity of the outer peripheral portion of the motor core 300 reaches the target temperature with a temperature uniformity in the circumferential direction and the vertical direction. Therefore, even if the temperature inside the vicinity of the outer peripheral portion of the motor core 300 does not reach the target temperature, the preheating step of the motor core 300 is completed if the temperature around the plurality of magnet insertion holes reaches the target temperature with a temperature uniformity in the circumferential direction and the vertical direction.

However, without raising the temperature inside of the motor core 300 close to the center, the heat used for heating in the vicinity of the outer peripheral portion of the motor core 300 escapes toward the inside of the motor core 300 close to the center. In the present embodiment, the holding jig 200 is heated by using the light sources 60 in order to suppress the heat generated by heating the cylindrical outer peripheral surface 300a of the motor core 300 from escaping to the inside of the motor core 300 near the center portion and to shorten the time required for heating the motor core 300. That is, by heating the holding jig 200, the support column 202 of the holding jig is heated, and from the through hole 300h of the motor core 300 to which the support column 202 is in direct contact, the heat is transferred radially toward the outer periphery of the motor core 300. As a result, it is possible to prevent the heat heating the cylindrical outer peripheral surface 300a of the motor core 300 from passing through the peripheries of the plurality of magnet insertion holes arranged to positions biased toward the outer periphery of the motor core 300 and escaping into the interior of the motor core 300, and it is possible to increase the temperature-rising speed around the plurality of magnet insertion holes of the motor core 300.

When using the light source 60 as a heating mechanism for heating the holding jig 200, there is a merit in that it is possible to maintain a high degree of cleanliness. It is also possible to use a heating mechanism such as induction heating. It is also possible to heat the holding jig 200 by directly contacting the support plate 201 with a heating mechanism such as a heating block.

Furthermore, it is also possible to form an accommodating space for accommodating a heater in the center portion of the support column 202 of the holding jig 200, to heat the support column 202. At this time, it is preferable to maintain the heating uniformity in the vertical direction of the support column 202 by a well-known method such as adjusting the density distribution of the heater winding, so as to maintain the heating uniformity in the vertical direction of the support column 202.

As a method for heating the motor core 300, a method of blowing hot air directly to the motor core 300 may also be mentioned. However, in this method, due to unevenness of the hot air, it is difficult to achieve uniform temperature control in the circumferential direction and the vertical direction of the motor core 300, and blowing of hot air causes a problem that particles or the like are attached to the motor core 300 to deteriorate cleanliness.

According to the present embodiment, the object to be heated W including the motor core 300 and the holding jig 200 can be heated efficiently and uniformly by the above-described configuration.

Further, according to the present embodiment, with the above configuration, it is possible to incorporate the pre-heating process into the manufacturing process of the motor core 300 in-line.

In the present embodiment, the motor core 300 and the holding jig 200 for holding are described as an example of the object to be heated W, but the heating apparatus of the present invention is applicable to any other object to be heated as long as it has a cylindrical outer peripheral surface.

In the above embodiment, the case where the motor core 300 is light-heated in the atmosphere has been described as an example. However, when the target temperature at the time of heating the object to be heated W is relatively high and the light-heating is performed in the atmosphere, there is a possibility that the thin steel plate 301 made of electromagnetic steel sheet or the like is thermally oxidized. As one method for preventing this, an inert gas is supplied into the closed accommodation space Sp, and the gas in the accommodation space Sp is exhausted at a constant flow rate by a pump connected to the exhaust pipe 21. At this time, it is important to suppress as much as possible the unevenness in the flow of gas in the accommodation space Sp for a uniform heating of the motor core 300.

The present invention is not limited to the above embodiments, and different variations and modifications can be made without departing from the spirit and scope of the present invention.

REFERENCE SIGNS LIST

1: Heating apparatus
10: Heating furnace
20: Covering member
20a: Cylindrical inner wall surface
20b: Ceiling surface
20c: Ceiling portion
21: Exhaust pipe
22: Flow-conditioning device
30: Light shielding member
30a: Inner periphery
31: Slit
30A: Light shielding member
Gp: Gap
40: Support member
50: Ring-shaped light source
51: Glass tube
52: Ring-shaped part
52a: Outer peripheral surface
Ct: Reflection film
53: Straight portion
54: Filament
55: Power supply wiring
60: Light source
100: Power supply device
102: Controller
105: Driver
W: Workpiece
200: Holding jig
201: Support plate
202: Support column
300: Motor core
300a: Cylindrical outer surface
300h: Through hole
301: Thin steel sheet
301a: Outer peripheral surface
301h: Inner surface
G: Gas

What is claimed is:

1. A heating apparatus for heating an object having a cylindrical outer peripheral surface, comprising:
    a support structure to support the object to be heated;
    a cover provided so as to be relatively movable in a vertical direction with respect to the support structure, and having an inner wall surface with an open lower end, the inner wall surface defining an accommodation space to accommodate the object to be heated, the cover is to close the accommodation space when the cover is disposed on the support structure, and the cover is to allow loading or unloading of the object to be heated when the cover is separated from the support structure;
    a plurality of ring-shaped light sources each provided to surround the cylindrical outer peripheral surface of the object to be heated and arranged in a vertical direction in the accommodation space and radiating light to heat the object to be heated; and
    a light shield provided on the inner wall surface of the cover, to block the incidence of mutual light between two adjacent ring-shaped light sources of the plurality of ring-shaped light sources.

2. The heating apparatus according to claim 1, wherein the inner wall surface of the cover comprises a reflecting surface to reflect the light from the plurality of ring-shaped light sources toward the object to be heated.

3. The heating apparatus according to claim 2, wherein the reflecting surface is formed of a mirror surface obtained by mirror-finishing the inner wall surface of the cover.

4. The heating apparatus according to claim 2, wherein the inner wall surface of the cover provided with the reflecting surface is a cylindrical inner wall surface, and
wherein the cylindrical inner wall surface, the plurality of ring-shaped light sources, and the cylindrical outer peripheral surface of the object to be heated are concentrically arranged.

5. The heating apparatus according to claim 1, wherein the light shield has a structure to prevent deformation due to thermal expansion.

6. The heating apparatus according to claim 1, further comprising a power supply device to independently control outputs of the two adjacent ring-shaped light sources separated by the light shield.

7. The heating apparatus according to claim 6, wherein an output of at least one of the ring-shaped light sources is controlled by adjusting a voltage supplied.

8. The heating apparatus according to claim 1, wherein each of the plurality of ring-shaped light sources has a filament to emit light and a glass tube that covers the filament, and wherein the glass tube has a reflective surface that reflects the light emitted from the filament toward the object to be heated.

9. A heating apparatus for heating an object having a cylindrical outer peripheral surface, comprising:
a support structure to support the object to be heated;
a cover provided so as to be relatively movable in a vertical direction with respect to the support structure, and having an inner wall surface with an open lower end, the inner wall surface defining an accommodation space to accommodate the object to be heated, the cover is to close the accommodation space when the cover is disposed on the support structure, and the cover is to allow loading or unloading of the object to be heated when the cover is separated from the support structure; and
a plurality of ring-shaped light sources each provided to surround the cylindrical outer peripheral surface of the object to be heated and arranged in a vertical direction in the accommodation space and radiating light to heat the object to be heated,
wherein the object to be heated includes a motor core formed of a stack of a predetermined number of annular thin steel sheets,
the motor core is held by a holding jig having a support column passing through a center of the motor core and a support plate provided with the support column,
the plurality of ring-shaped light sources heats a cylindrical outer peripheral surface of the motor core, and
the heating apparatus further comprises a heater to heat the holding jig.

10. A heating apparatus comprising:
a support structure to support an object to be heated;
a cover provided so as to be relatively movable with respect to the support structure, and the cover is to close an accommodation space between the support structure and the cover that accommodates the object to be heated when the cover is disposed on the support structure;
a plurality of light sources arranged in a predetermined direction in the accommodation space to radiate light to heat the object to be heated;
a light shield to block incidence of mutual light between the plurality of light sources; and
a power supply device to independently control outputs of the light sources separated by the light shield, wherein
the light shield is provided on an inner wall surface of the cover, to block the incidence of mutual light between two adjacent light sources of the plurality of light sources.

* * * * *